Figure 1:
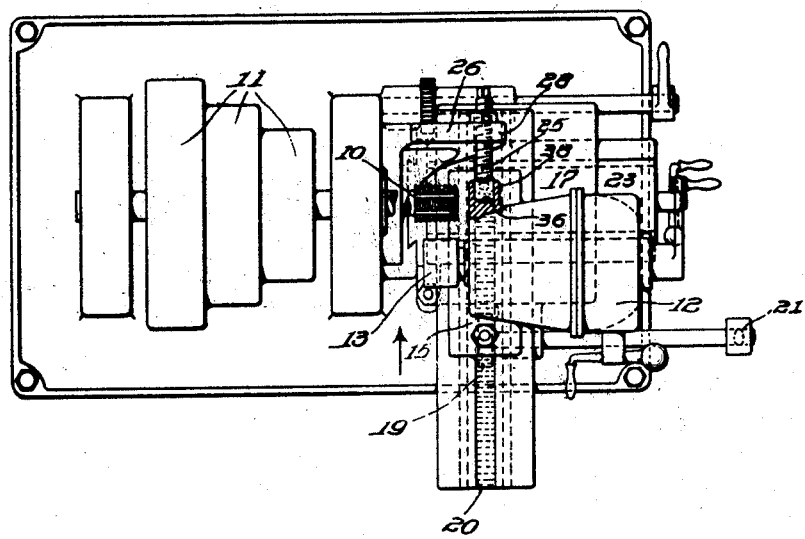

P. P-G. HALL.
COMBINATION OF MACHINE AND STOP DEVICE USED THEREWITH.
APPLICATION FILED JUNE 7, 1918.

1,316,717.

Patented Sept. 23, 1919.
2 SHEETS—SHEET 1.

WITNESS
F. J. Hartman

INVENTOR
Peter P-G. Hall.
BY Fristoe & Blount
ATTORNEYS

P. P-G. HALL.
COMBINATION OF MACHINE AND STOP DEVICE USED THEREWITH.
APPLICATION FILED JUNE 7, 1918.

1,316,717.

Patented Sept. 23, 1919.
2 SHEETS—SHEET 2.

INVENTOR
Peter P-G. Hall.

WITNESS

BY

ATTORNEYS

UNITED STATES PATENT OFFICE.

PETER P-G. HALL, OF PHILADELPHIA, PENNSYLVANIA.

COMBINATION OF MACHINE AND STOP DEVICE USED THEREWITH.

1,316,717.   Specification of Letters Patent.   Patented Sept. 23, 1919.

Application filed June 7, 1918. Serial No. 238,753.

*To all whom it may concern:*

Be it known that I, PETER P-G. HALL, a citizen of the United States, and a resident of the city of Philadelphia, county of Philadelphia, State of Pennsylvania, have invented certain new and useful Combination of Machine and Stop Device Used Therewith, of which the following is a specification.

This invention relates to a stop mechanism and novel arrangement thereof with the operating parts of a machine in connection with the operation of which the stop is used. In certain types of machines, stops are provided for bringing the operating part or tool to a fixed position relative to the work being operated upon, to govern the depth to which the tool performs its operation on the work, as, for example, to govern the diameter of a thread cut or a surface milled. Moreover, it is often desirable to maintain an operating tool and the work operated upon in a fixed relative position during operation. It therefore becomes essential, in order to secure accuracy in results produced, to insure to a very accurate degree of refinement of the point at which the tool is brought relative to the work, or held relative thereto, regardless of any possible wear or looseness of the various adjusting parts of the machine by which the work and tool are actually brought into the relative positions mentioned and also regardless of the force applied by the operator in manipulating the device.

The object of this invention is to insure and maintain accurate adjustment of these novel parts of a machine by a novel arrangement of stop relative to the point of engagement between a tool and the work so as to entirely eliminate any possible further relative movement between the work and tool after they have been brought to stop position which otherwise produces irregular and inaccurate work, as, when an excessive force is applied to bring the tool to stop position or when there is any looseness between the parts of the machine adjusted. Further objects of this invention are to provide a novel type of stop mechanism arranged to prevent the access of foreign material and dirt to interfere with a proper operation thereof; to provide a novel type of bracket which may be attached in various positions on a machine with which the device may be used in a great variety of locations to obtain the advantageous results of properly locating the stop relative to the tool and the work; to provide a unitary, self-contained stop device which may be applied to various types of machines now on the market without necessitating any change in the machine itself and to provide a stop mechanism which may be arranged in a definite relation to the path of movement of a machine tool, a fixture or a piece of work operated upon, as the case may be, this feature of the invention coöperating with the arrangement stated above to insure an extremely accurately operating machine using a stop to determine the action of an operating tool on the work operated upon.

It is to be understood that this invention is in no way limited to the particular type of machine with which it has been illustrated in order to exemplify one adaptation of the invention, as it would be practically impossible to illustrate all the types of machines, or the several forms of the separate types to which my invention could be readily applied. In the drawings, my novel type of stop mechanism and the location thereof is shown as applied to a thread milling fixture of the hand-operated type.

Figure 2:
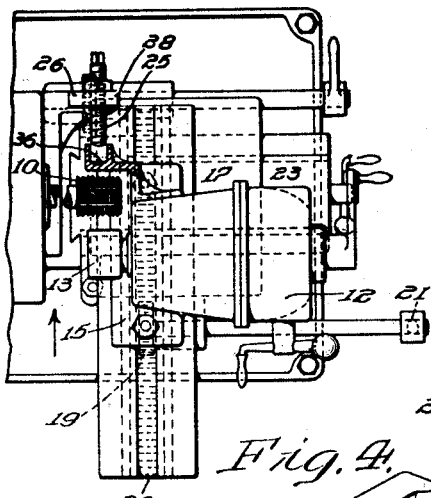
Figure 3:
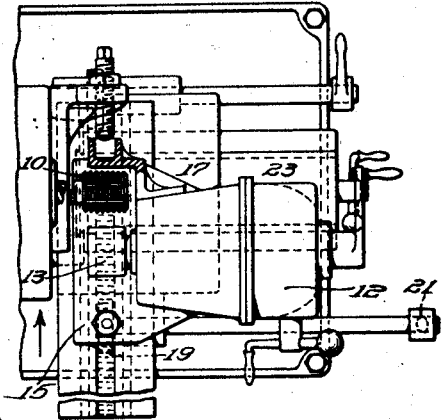
Figure 4:
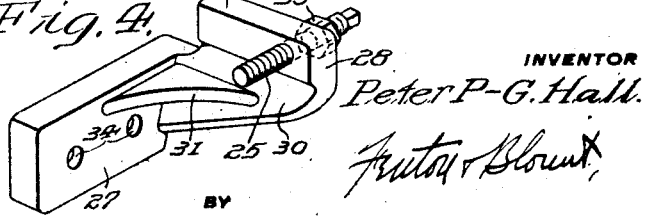

Figure 1 is a plan view of a milling machine and thread milling fixture associated therewith showing one embodiment of my invention; Fig. 2 is a similar view of a modified arrangement of my invention, while Fig. 3 is a similar view of a further modification of an arrangement of the mechanism and stop forming my invention. Fig. 4 is a perspective view of part of the stop mechanism or the bracket detached from the mechanism showing the adaptability of the device to various types of machines in any desired location. Figs. 5, 6, 7 and 8 show the application of the invention used when either a horizontal or vertical feed between a cutter and a piece of work is employed with various arrangements of a machine, the arrows indicating the direction of the feed.

Figure 5:
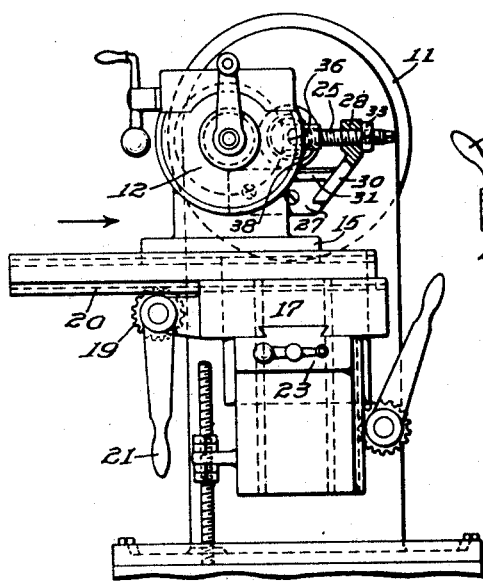
Figure 6:
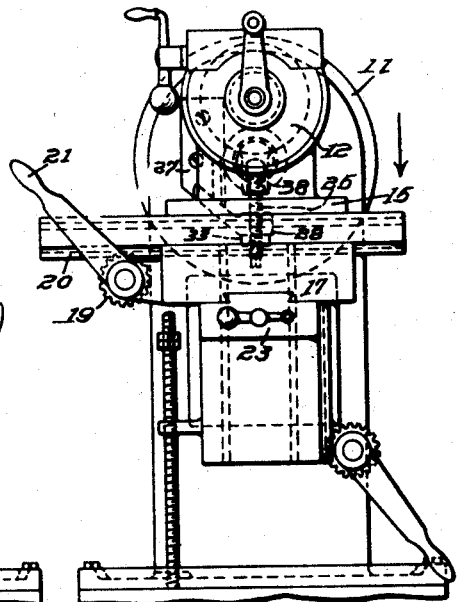
Figure 7:
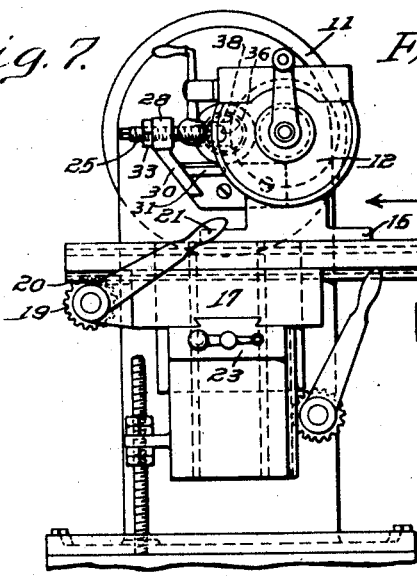
Figure 8:
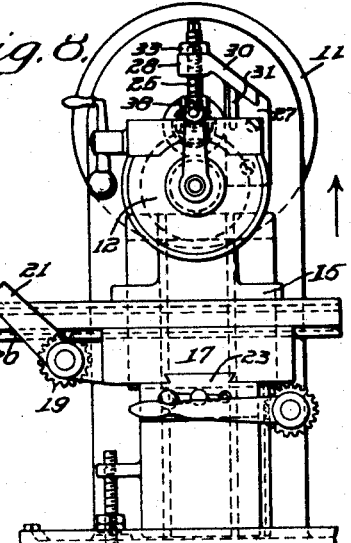

Referring to Figs. 1 and 5, cutter 10 may be driven in any manner through power applied to any one of the pulleys 11, while the thread milling fixture 12 is adapted to receive the work 13 in the collet thereof, the fixture 12 being so mounted as to be fed longitudinally and transversely of the bed of the machine as well as vertically thereof, as will be readily understood by those skilled in the art. Thus, the fixture 12 may be carried by a support 15 mounted to slide transversely of the plate 17, a similar arrangement being also shown in Fig. 5. One suitable means for sliding the support 15 may be a pinion 19 adapted to engage a rack 20 and operated by a handle 21. The entire fixture 12 and support 15 may be moved longitudinally by a like sliding arrangement of the plate 17 relative to a supporting plate 23, as will appear from Fig. 5. Moreover, the fixture 12 may also have a vertical adjustment by a similar arrangement but it is to be understood that any other type of feeding mechanism, other than that illustrated, may be used with my arrangement of stop mechanism which will now be described.

In Fig. 1, the stop 25 is shown as being carried by the supporting bracket 26 so as to be in substantially a horizontal plane passing through the point of contact between the cutter 10 and the work 13. One suitable bracket is illustrated in Fig. 4 as provided with a supporting piece 27 and an offset upwardly extending portion 28 located at right angles thereto, although there may be any desired angle between these two elements, the same being connected by a portion 30 and the corner of the bracket being reinforced, if desired, by a web 31. The stock 25 is adjustably secured in the projection 28 and locked in position by the nut 33. The supporting piece 27 is provided with a plurality of apertures 34 therein for the reception of fastening means to position the bracket to any desired portion of the machine. Various other types of supporting brackets with adjustable stops therein could be substituted for that shown in Fig. 4 as will be readily understood by those skilled in the art.

In the embodiment illustrated in Fig. 1, the fixture 12 is provided with a stop face 36 against which the end of the stop 25 is adapted to engage when the proper relative position, dependent upon the adjustment of the stop 25, between the tool and work has been effected. The stop face 36 may be a special surface or abutment or the same may be merely a surface of the fixture itself having no separate identity therefrom. Moreover, the same may be provided with a tubular extension 38 adapted to surround and inclose the stop 25 during partial or entire approach and separation of the same relative to the face 36 to prevent the ingress of foreign matter between the stop and stop face which might otherwise interfere with the accuracy obtained. It is to be understood that the casing 38 may surround the stop 25 even when the tool 10 and work 13 have been separated to their greatest normal extent in the usual operation of the machine. This prevents the accumulation of chips or other foreign matter on the stop 25 or face 36 during a repeated operation of the machine in turning out a large quantity of similar articles, which is the way machines of this character are usually operated. It is to be understood, however, that this refinement of construction is not essential to the broad aspect of this invention.

Referring to Fig. 1, it will be seen that, when the fixture 12 is fed toward the tool 10 by an operation of the handle 21, the stop 25 and face 36, being located in substantially the same horizontal plane as that passing through the work and tool as well as in close proximity to the actual point of contact between the tool and the work, come into contact and bring the moving parts of the machine to a dead stop, holding the same in this position and preventing any swinging, tilting, shifting or movement of the work 13 relative to the tool 10 regardless of the amount of force with which the operator moves the carriage or support 15 transversely of the machine and regardless of any possible looseness, however slight, between the carriage 15 and the guide ways in which it moves and by which it is supported. By this arrangement any possibility of making oval threads, threads of irregular depth, or other irregularities on a piece of work being operated upon is substantially eliminated.

In Fig. 2, the stop 25 and face 36 are shown as located in substantial alinement with the cutter 10 and work 13 and directly in the rear thereof. Various means could be readily used for accomplishing this arrangement. As shown, the stop 25 is located in the projection 28 of the bracket 26 somewhat nearer the supporting piece 27 and the stop face 36 carried by the fixture 12 is offset and extended so as to be located in the proper position to move against the stop 25. In Fig. 2, the work 13, the cutter 10 and the co-acting stops are located in substantially the same horizontal plane as in the arrangement shown in Fig. 1. By a location of the stop 25 and face 36 rearwardly of the tool 10 and in alinement therewith in Fig. 2, it will be seen that a further degree of refinement in the accuracy of the results produced by the machine when operated is obtained since there is no lateral distance between the point of contact of the stops and the point of contact of the tool and work which might permit the tool or work to swing laterally relative to the point of contact of the stops.

In Fig. 3 there is illustrated a further modification of an arrangement of the mechanism with which my invention is incorporated showing the application thereof to one type of machine wherein the stop 25 and face 36 are in substantially the same position as that hereinbefore described in connection with Fig. 2, but in addition thereto, the center line of the carrier 15 which slides in guideways in the plate 17 is located in the vertical plane passing through substantially the center of the stop 25, stop face 36, cutter 10 and work 13. As it reduces to a minimum the vertical distance between the stops and the slide way for the fixture on the tool and renders negligible any effects on the work of any possible vertical swing of the fixture about the point of contact of the stops, this arrangement is particularly effective for the purposes intended. Thus, when the carrier 15 is moved in the direction of the arrow shown in Fig. 3, it will be seen that the work is brought to proper stop position and held therein with no possibility of relative movement between the work and the tool due to the location of the coacting stops in substantially the same horizontal plane passing through the work and tool, their location in alinement with the line passing through the center of the tool and work and the location of the guideways for the carrier 15 or the location of the carrier 15 in a vertical plane passing through the line of the work 13, tool 10 and coacting stops 25 and 36. However, it is to be understood that my invention is not limited in any manner to the precise arrangements described and illustrated but that the parts may be located somewhat removed from the boundaries defined herein and still such an arrangement will produce accurate results heretofore unobtainable with the known forms and locations of stops in various types of machines.

Referring to Figs. 5, 6, 7 and 8, these figures illustrate the adaptation of the principles of my invention to various types of relative feed between a piece of work and an operating tool in the various directions indicated by the arrows on these figures. Thus, in Fig. 5 the fixture 12 is fed horizontally toward the right to stop position, in Fig. 6 the fixture is fed downwardly in a vertical plane, in Fig. 7 horizontally toward the left and in Fig. 8 vertically in any upward direction. It is evident from the variations of the application of my invention illustrated herein, that the stop device and a suitable arrangement of the moving parts of a machine may be devised for all conceivable types of machines as well as for all possible directions of movement or speeds between any operating parts which it is desired to bring and maintain in a stop position.

Having thus described my invention, I claim and desire to protect by Letters Patent of the United States:

1. In a machine in which a tool is adapted to operate on a piece of work and means are provided to cause a relative movement between the tool and the work to effect a feed of the tool in the work, the combination of a stop therefor located in a horizontal plane passing through the tool and the work and in alinement therewith.

2. In a machine having a tool adapted to operate on a piece of work and means to cause a relative movement between the tool and the work to feed the tool into the work, the combination of a stop therefor, located in a horizontal plane passing through the tool and work and in alinement with the tool and work in the direction of the path of their relative movement.

3. In a machine having a tool adapted to operate on a piece of work with means to cause a relative movement between the tool and the work, including a support adapted to slide on a bed plate, the combination of a stop therefor located in the horizontal plane passing through the work and in the vertical plane passing centrally through said bed plate.

4. In a machine having a tool adapted to operate on a piece of work with means to cause a relative movement between said tool and work including a support adapted to slide on a bed plate, the combination of a stop therewith located in a horizontal plane passing through the work and tool and in a vertical plane passing centrally through said bed plate and through said tool.

5. In a machine provided with means to support a piece of work and a tool adapted to operate upon said work with mechanism operative to produce relative movements between said tool and work, the combination of a means for limiting said movement in one direction, said means including an adjustable contact member and a contact surface, said member and surface disposed in alinement with and in a plane passing through said cutter and tool.

6. In a machine having a tool adapted to operate on a piece of work with means whereby a relative movement between the tool and the work may be effected, the combination of a stop therefor located on one side of one of the coöperating elements of a tool and piece of work and another of the coöperating elements located on the opposite side thereof said stop, tool and work being disposed in alinement.

7. In a machine adapted to receive a tool for operating upon a piece of work and means to effect a relative movement between said tool and said work, the combination of a stop located in a fixed position on the machine and a coacting stop face carried by a movable element of the machine with means to protect said stop and stop face against the entrance of interfering matter therebetween.

8. A stop supporting bracket including a supporting piece adapted to be secured in position on a machine and means carried thereby for adjustably supporting a stop and means on said machine operative to engage therewith and to protect said stop against the entrance of interfering matter between it and said means.

9. In a stop device, the combination of a supporting piece provided with means for attachment in any position on a machine, a supporting bracket on said supporting piece, a stop member adjustably supported in said supporting bracket, a contact means on a movable part of said machine and engageable by said stop member, and a protecting extension projecting from said contact means and surrounding said stop member, whereby interfering matter is excluded.

10. In a stop device, the combination of a supporting means provided with means for attachment in any position on a machine, a supporting bracket on said supporting piece, a stop screw adjustably mounted in said supporting bracket, a contact means on a movable part of said machine in alinement with said stop screw and engageable therewith, and a tubular extension projecting from said contact means and surrounding the end of said stop screw, whereby the contact means and the stop screw are protected from the entrance of any interfering matter therebetween.

In witness whereof, I have hereunto set my hand this fifth day of June, 1918.

PETER P-G. HALL.